US012793325B2

(12) United States Patent
Michel et al.

(10) Patent No.: US 12,793,325 B2
(45) Date of Patent: Nov. 10, 2026

(54) NEURAL BASED GEOMETRY IN BOUNDING VOLUME HIERARCHY

(71) Applicant: Adobe Inc., San Jose, CA (US)

(72) Inventors: Élie Louis Simon Michel, Paris (FR); Tamy Boubekeur, Paris (FR); Jean Marc Christian Marie Thiery, Paris (FR); Iliyan Atanasov Georgiev, London (GB); Philip Weier, Saarbrücken (DE)

(73) Assignee: Adobe Inc., San Jose, CA (US)

( * ) Notice: Subject to any disclaimer, the term of this patent is extended or adjusted under 35 U.S.C. 154(b) by 277 days.

(21) Appl. No.: 18/669,509

(22) Filed: May 20, 2024

(65) Prior Publication Data

US 2025/0356575 A1 Nov. 20, 2025

(51) Int. Cl.
*G06T 15/08* (2011.01)
*G06T 15/06* (2011.01)
*G06T 15/20* (2011.01)

(52) U.S. Cl.
CPC .............. *G06T 15/08* (2013.01); *G06T 15/06* (2013.01); *G06T 15/20* (2013.01); *G06T 2200/24* (2013.01); *G06T 2210/21* (2013.01)

(58) Field of Classification Search
CPC ......... G06T 15/04; G06T 15/06; G06T 17/00; G06T 2207/30302; G06T 5/60; G06N 20/00; G06N 3/02; G06N 3/08
See application file for complete search history.

(56) References Cited

U.S. PATENT DOCUMENTS 10,839,475 B2 * 11/2020 Benthin ................ G06F 9/3877
2024/0104824 A1 * 3/2024 Gupta ..................... G06T 17/10

OTHER PUBLICATIONS

Feng, Brandon , et al., "PRIF: Primary Ray-based Implicit Function", In Proceedings of the European Conference on Computer Vision (ECCV) (Tel Aviv, Israel). Springer-Verlag, Berlin, Heidelberg,[retrieved from the internet on Aug. 18, 2024] <https://doi.org/10.1007/978-3-031-20062-5_9>, 2022, pp. 138-155.
Fujieda, Shin , et al., "Neural Intersection Function", Cornell University arXiv, arXiv.org [retrieved Aug. 18, 2024]. Retrieved from the Internet <https://arxiv.org/pdf/2306.07191>, 2023, 11 pages.
(Continued)

*Primary Examiner* — Michelle L Sams
(74) *Attorney, Agent, or Firm* — FIG. 1 Patents

(57) ABSTRACT

Techniques for neural based geometry in bounding volume hierarchies are described for enabling identification of properties of geometric objects of a scene. In an example, a processing device is operable to receive a bounding volume hierarchy that partitions geometric objects of a three-dimensional scene into bounding volumes individually assigned to respective nodes. At least one said node includes a neural representation encoding neural network information representing a respective said geometric object. The processing device is further operable to render the scene using the bounding volume hierarchy by constructing the respective said geometric object using the neural representation. The processing device is further operable to present the rendered scene for display in a user interface.

10 Claims, 7 Drawing Sheets

(56) References Cited

OTHER PUBLICATIONS

Mildenhall, Ben , et al., "NeRF: Representing Scenes as Neural Radiance Fields for View Synthesis", Cornell University arXiv, arXiv.org [retrieved Mar. 19, 2023]. Retrieved from the Internet <https://arxiv.org/pdf/2003.08934.pdf>., Aug. 3, 2020, 25 Pages.
Muller, T., et al., "Instant Neural Graphics Primitives with a Multiresolution Hash Encoding", Cornell University arXiv Preprint, arXiv.org [retrieved Jul. 21, 2024]. Retrieved from the Internet <https://arxiv.org/pdf/2201.05989>., May 4, 2022, 15 pages.
Scandolo, Leonardo , et al., "Directed acyclic graph encoding for compressed shadow maps", In High-Performance Graphics. The Eurographics Association, Eindhoven, Netherlands, [retrieved from the internet on Aug. 18, 2024, <https://doi.org/10.2312/hpg.20211283>, 2021, pp. 53-59.
Takikawa, Towaki , et al., "Neural Geometric Level of Detail: Real-time Rendering with Implicit 3D Shapes", Cornell University arXiv, arXiv.org [retrieved Aug. 18, 2024]. Retrieved from the Internet <https://arxiv.org/pdf/2101.10994>, 2021, 16 pages.
Takikawa, Towaki , et al., "Variable Bitrate Neural Fields", Cornell University arXiv, arXiv.org [retrieved Aug. 18, 2024]. Retrieved from the Internet <https://arxiv.org/pdf/2206.07707>, 2022, 10 pages.
Xie, Yiheng , et al., "Neural Fields in Visual Computing and Beyond", Cornell University arXiv, arXiv.org [retrieved Aug. 18, 2024]. Retrieved from the Internet <https://arxiv.org/pdf/2111.11426>, 2022, 36 pages.

* cited by examiner

NEURAL BASED GEOMETRY IN BOUNDING VOLUME HIERARCHY

BACKGROUND

Ray tracing and path tracing are computer graphics techniques for accurately simulating light behavior on geometric objects being rendered from three-dimensional constructions of a scene. By accurately simulating light interactions, these techniques enable realistic renderings that convey complex lighting effects, such as shadows, reflections, and refractions, which are otherwise challenging to achieve. Some conventional ray tracing and path tracing techniques are computationally intensive processes that consume significant amounts of processing power and memory, which inhibits real-time graphics rendering.

SUMMARY

Techniques for using neural based geometry in bounding volume hierarchies are described. In an example, a content processing system is operable to render an image based a three-dimensional (3D) scene geometry that is received as an input. The content processing system encodes spatiality data derived from the input within neural representations, which are stored at leaf nodes of a bounding volume hierarchy type acceleration structure. These neural representations, for instance, compress visibility data and/or other object properties into neural network information to define the complex geometries of geometric objects within the scene. In one or more aspects, the neural representations are trained to overfit ground truth data that is based on object primitives contained in the scene geometry. Storing neural network information within neural representations enables the content processing system to consume less memory than using other types of acceleration structures that store groups of object primitives. The neural network information is queried by the content processing system during ray tracing or path tracing processes to derive the visibility data and/or other object properties, which is useful for rendering an image of the scene. The visibility data and/or other object properties is queried from the neural representations instead of performing intersection tests with object primitives, as is done with other approaches to scene construction.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
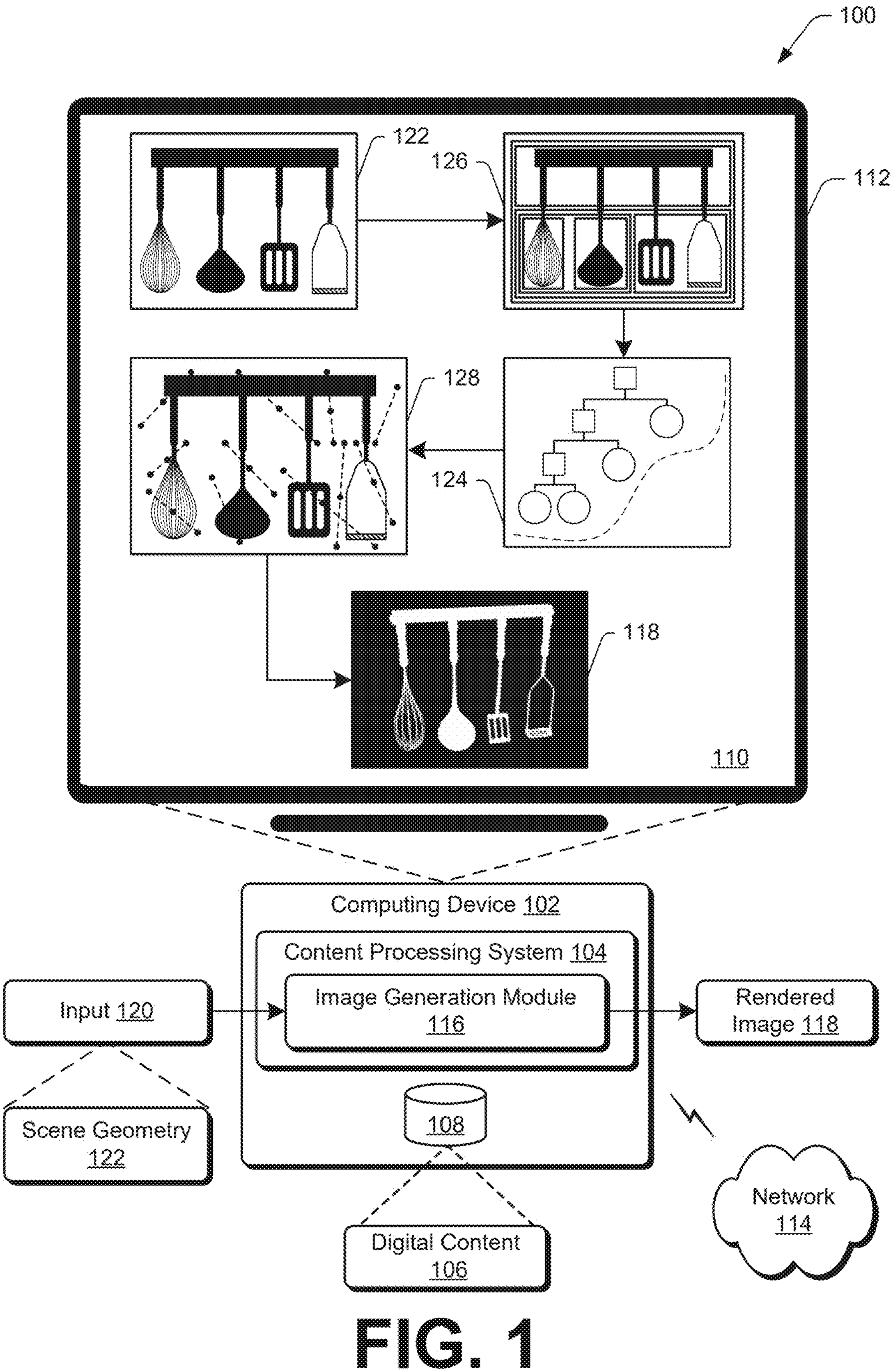
FIG. 1 is an illustration of a digital medium environment in an example implementation that is operable to employ techniques described herein for applying neural based geometry in bounding volume hierarchies.

Ray tracing and path tracing are computer graphics techniques for simulating light behavior on geometric objects being rendered from 3D constructions of scenes. The scene constructions are often composed of numerous object primitives (e.g., polygons, triangles), which represent object surfaces. During these rendering processes, light sources illuminate the scene to test object visibility of the surfaces by identifying intersections between light rays and the object primitives.

However, querying a 3D scene construction for determining object visibility is computationally intensive. Determining ray intersections involves significant processing power, and representation of the spatiality of the object primitives consumes a large amount of memory in many real world scenarios. This limits the performance of real-time graphics rendering.

To enhance efficiency of ray or path tracing processes, an acceleration structure such as a bounding volume hierarchy is used. The bounding volume hierarchy stores the spatial complexity of a scene in a hierarchical manner using a tree data structure. Each geometric object is assigned to one or more bounding volumes, with roots and branch nodes in the tree representing a bounding volume that encloses a group of geometric objects. The leaf nodes (e.g., the last nodes in the tree data structure) store the object primitives that define the object surfaces of the geometric objects within each group. This hierarchical organization allows intersection tests to focus on a small subset of the object primitives, improving rendering efficiency.

Despite a bounding volume hierarchy's simplification of ray intersection tests, traversing a large bounding volume hierarchy strains processing and memory resources. Some bounding volume hierarchies, for instance, struggle to represent fully static or dynamic scenes. Hardware-based path tracing or ray tracing enhance rendering performance by implementing a bounding volume hierarchy directly on hardware. However, this approach is dependent on specialized graphics processing units (GPUs), which are not available in some computing architectures. Therefore, conventional bounding volume hierarchy approaches are not practical for some computing environments, including those where visibility queries are frequently executed for real-time interactivity and dynamic content rendering, such as in games or augmented/virtual reality.

Accordingly, techniques for neural based geometry in bounding volume hierarchies are described to enable efficient identification of properties associated with geometric objects of a scene. Implementation of the described techniques improves rendering performance by using an acceleration structure having increased efficiency and compactness for constructing a scene than a conventional bounding volume hierarchy approach.

In an example, a computing device receives, as input, a scene geometry containing spatiality data that is indicative of various geometric objects included in a 3D scene. The spatiality data includes object primitives (e.g., triangles, polygons) that indicate properties (e.g., color, size, orientation, or placement within a 3D space) of individual object surfaces. Based on the scene geometry, the computing device renders the scene for display in a user interface. For example, the computing device produces an image that depicts a perspective of the scene, including application of light reflections and shadows associated with the geometric objects when viewed from that perspective.

To render the scene, the computing device generates a scene construction based on the spatiality data extracted from the scene geometry. The scene construction is a scene-specific acceleration structure that is queried for ray or ray segments that are traced during rendering. The scene construction encodes the spatiality data using neural representations instead of storing object primitives in one or more examples. In response to receiving the scene geometry as an input, for instance, the computing device generates a tree data structure that is similar to a conventional bounding volume hierarchy. The computing device generates the scene construction as a hierarchal tree structure that partitions geometric objects defined by the scene geometry into bounding volumes individually assigned to respective nodes of the tree. However, unlike a conventional bounding volume hierarchy that stores object primitives at leaf nodes, the scene construction is implemented using one or more neural representations (e.g., neural models, neural hash grids, sparse data structures) at one or more leaf nodes.

The neural representations are trained to encode neural network information (e.g., complex functions) that are configured to be queried during ray or path tracing to obtain the spatiality data that is otherwise inferable from analyzing object primitives. The neural representations are efficiently queried during ray tracing or path tracing to evaluate intersections between rays or ray segments and the encoded geometries without directly evaluating object primitives, e.g., one at a time.

Consider a scenario in which a conventional bounding volume hierarchy includes a tree structure containing a single object primitive at each leaf node. When ray or path tracing is performed using a conventional acceleration structure, an intersection along each input ray is sought for each leaf, i.e., each object primitive. If an intersection is not identified with a first ray, the ray tracing continues by inspecting each of the other leaves to determine whether any of the object primitives at the other leaves intersect that ray.

Unlike this conventional case, a neural based geometry bounding volume hierarchy as described herein has at one or more leaf nodes, a neural representation that encodes neural network information about multiple object primitives. An intersection test is performed at the neural representations to determine intersections with complex geometries defined by multiple object primitives at once. Instead of a simple test about whether a line intersects each individual object primitive, a trained neural representation is queried to determine an intersection between a ray or ray segment and a complex geometry encompassing potentially many object primitives. The neural representations return object properties at intersections of rays or ray segments used as input queries to the neural representations.

The neural representations improve speed and efficiency of ray and path tracing processes that enable the computing device to render and re-render images. In addition, using neural representations as the leaf nodes of the neural based geometry bounding volume hierarchy structure consumes less memory than leaf nodes of a conventional bounding volume hierarchy approach, which store the actual object primitives.

The neural representations are trained using machine-learning techniques to encode the neural network information. For example, the neural representations are overfit trained based on ground truth data derived from the scene geometry. In other examples, the neural representations are optimized through other training techniques (e.g., without overfitting) to encode the ground truth data derived from the scene geometry. In one or more examples, the ground truth data is obtained from spatiality data associated with the object primitives stored at corresponding leaf nodes of a conventional bounding volume hierarchy structure. The computing device, for instance, temporarily stores a conventional bounding volume hierarchy constructed from the scene geometry until the neural representations have been optimized (e.g., overfit) to encode the spatiality data inferred from object primitives maintained at leaf nodes of the temporary bounding volume hierarchy structure. In one or more implementations, a neural representation encodes neural network information that is based on the ground truth data derived from multiple leaf nodes of the conventional bounding volume hierarchy structure. In this way, the neural based geometry bounding volume hierarchy structure stores a scene construction using far fewer leaf nodes than the conventional bounding volume hierarchy structure from which the ground truth data is obtained.

The neural based geometry in bounding volume hierarchy techniques described herein allow for more resource efficient scene constructions than conventional processes. Implementation of the techniques enhance rendering performance by facilitating efficient ray and path tracing processes. Unlike some conventional processes that struggle with frequent visibility queries on resource limited architectures, these techniques are adaptable for near real-time interactivity and dynamic content rendering across various computing environments, including to implement games and augmented/virtual reality experiences.

Further discussion of these and other examples and advantages are included in the following sections and shown using corresponding figures. In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Scene Construction Environment

FIG. 1 is an illustration of a digital medium environment 100 in an example implementation that is operable to employ scene construction techniques described herein for applying neural based geometry in bounding volume hierarchies. The environment 100 includes a computing device 102, which is configurable in a variety of ways.

The computing device 102, for instance, is configurable as a processing device such as a desktop computer, a laptop computer, a mobile device (e.g., assuming a handheld configuration such as a tablet or mobile phone), and so forth. Thus, the computing device 102 ranges from full resource devices with substantial memory components and processor resources (e.g., personal computers, game consoles) to a low-resource device with limited memory and/or processing resources, e.g., mobile devices. Additionally, although a single computing device 102 is shown, the computing device 102 is also representative of a plurality of different devices (e.g., a computing system), such as multiple servers utilized by a business to perform operations "over the cloud" as described in FIG. 7.

The computing device 102 is illustrated as including a content processing system 104. The content processing system 104 is implemented at least partially in hardware of the computing device 102 to process and transform digital content 106, which is illustrated as being maintained in storage 108 of the computing device 102. Such processing includes creation of the digital content 106, modification of the digital content 106, and rendering or re-rendering of the digital content 106 for presentation in a user interface 110, e.g., for output by a display device 112. Although illustrated as implemented locally at the computing device 102, functionality of the content processing system 104 is also configurable in whole or in part through functionality available via the network 114, such as part of a web service or "in the cloud".

An example of functionality incorporated by the content processing system 104 for processing the digital content 106 is illustrated as an image generation module 116. The image generation module 116 is configured to generate a rendered image 118 based on an input 120 that includes a scene geometry 122. For example, from the user interface 110, the rendered image 118 is usable to further a variety of computing functions, e.g., immersive game play, virtual and augmented reality, digital media creation. User inputs received at the user interface 110 are usable to re-render the rendered image 118 and depict a different perspective of the scene, for instance, as a near real-time response to the user input.

The scene geometry 122 includes spatiality data about geometric objects within a 3D scene. The scene geometry 122, for instance, includes many object primitives that represent object properties (e.g., color, size, position, orientation, other surface characteristics) of the geometric objects in the scene. Each of the object primitives includes polygon representations (e.g., triangles, other shapes) or object models that represent the geometric objects in the scene.

In the illustrated example, the image generation module 116 receives the scene geometry 122, which models a group of kitchen utensils hanging from a rack located in a simulated 3D space. Based on the scene geometry 122, the image generation module 116 is operable to generate the rendered image 118 to present the kitchen utensils from a particular viewing angle (e.g., a perspective showing an orientation of the rack and utensils) given a target set of lighting conditions. For instance, in the rendered image 118, the kitchen utensils are depicted from a shallow, top-down angle that shows surface reflections and/or shadows on the kitchen utensils under simulated lighting conditions, e.g., defined by an environment map.

As illustrated, the image generation module 116 produces the rendered image 118 by generating a scene construction 124 (e.g., an acceleration structure) based on the spatiality data obtained from the scene geometry 122. The scene construction 124 is queried by the image generation module 116 during rendering to extract object properties, including visibility information, defined by the scene geometry 122.

The image generation module 116 maintains the scene construction 124 in the storage 108 or other memory of the computing device 102. The scene construction 124 represents the scene geometry 122 in a bounding volume hierarchy type tree structure that uses neural representations instead of object primitives at one or more of the leaf nodes of the tree. In the illustrated example, neural representations at the leaf nodes of the scene construction 124 are depicted in FIG. 1 with circles as a way to distinguish them from other nodes of the scene construction 124, which are illustrated as squares. Unlike other bounding volume hierarchy type tree structures that encode object primitives (e.g., polygons, triangles) within these leaf nodes, the image generation module 116 includes these neural representations at the leaf nodes. The neural representations improve speed and efficiency of ray tracing and path tracing processes subsequently performed to produce and re-produce the rendered image 118, e.g., to support real-time updates of the user interface 110.

In one or more implementations, the image generation module 116 generates the scene construction 124 based on an initial bounding volume hierarchy 126 constructed from the scene geometry 122. The image generation module 116 builds the bounding volume hierarchy 126 in the storage 108 of the computing device 102 to partition geometric objects inferred from the scene geometry 122 into multiple bounding volumes. These bounding volumes group different parts of the scene geometry 122 into a hierarchy of rectangles or other bounding shapes, e.g., bounding boxes. The largest bounding volume of the bounding volume hierarchy 126, for instance, encompasses the rack and each of the utensils. A second largest bounding volume contains the rack separate from another second largest bounding volume that encompasses the utensils. Two third-largest bounding volumes of the bounding volume hierarchy 126 encompass different groups of two utensils. Two smallest bounding volumes each encompass a different utensil from the group of two utensils encapsulated by one of the third-largest bounding volumes.

The image generation module 116 individually assigns each of the bounding volumes (e.g., each of the rectangles, each of the bounding boxes) to respective nodes in the scene construction 124. For example, the largest bounding volume is stored at a root node of the scene construction 124. The second largest bounding volume, which contains the rack, is stored in a first leaf node by a first neural representation used to encode spatiality data of the rack. The other second largest bounding volume is encoded in a first branch node. One of the third largest bounding volumes, which contains a first group of the utensils, is stored in a second leaf node following the first branch node. The second leaf node includes a second neural representation used to encode spatiality data of the first group of the utensils. The other third largest bounding volume, which contains a second group of the utensils, is stored as a second branch node. The two smallest bounding volumes are separately stored in a third leaf node and a fourth leaf node, respectively, which follow the second branch node. The third leaf node represents a first utensil from the second group using a third neural representation to encode spatiality data of the first utensil. The fourth leaf node represents a second utensil from the second group using a fourth neural representation to encode spatiality data of the second utensil.

Each of these neural representations stored at leaf nodes of the scene construction 124 encode neural network information. The neural network information represents the spatiality data associated with one or more geometric objects of the scene geometry 122. For example, the neural representations are trained (e.g., using machine learning techniques) to encode neural network information learned from ground truth data obtained from analyzing the object primitives included in the bounding volume hierarchy 126. In one or more examples, the neural representations are trained to overfit to the ground truth data derived from the bounding volume hierarchy 126. In one or more other examples, the neural representations are optimized to encode the ground truth data derived from the bounding volume hierarchy 126 in other ways (e.g., without overfitting). In one or more implementations, the ground truth data that is used for training a neural representation at a single leaf node of the scene construction 124 is obtained from analyzing the object primitives encompassed by multiple leaf nodes of the bounding volume hierarchy 126. With leaf nodes of the scene construction 124 being implemented by neural representations, the scene construction 124 stores complex representations of the scene geometry 122 as neural network information rather than storing the object primitives.

A leaf node of the bounding volume hierarchy 126 does not contain neural representations or neural network information. Instead, the tree structure of the bounding volume hierarchy 126 has many leaves that each store one or more of the many object primitives extracted from the scene geometry 122. The bounding volume hierarchy 126, in one or more instances, has a greater quantity of leaf nodes than a quantity of neural representations encoded by the scene construction 124. As such, the bounding volume hierarchy 126 is considerably larger in this instance than the scene construction 124 and consumes an increased amount of capacity in the storage 108 than the scene construction 124.

In the illustrated example, consider the whisk among the utensils defined by the scene geometry 122. A ray or path drawn across the bounding volume encompassing the whisk intersects the whisk at one or more points in the 3D space. When a neural representation associated with the whisk receives the ray or path as an input, the scene construction 124 is configured to determine from an output of the neural representation that there is an intersection between the input ray and a complex geometric surface associated with the whisk. The intersection is identified without inspecting individual bounding volumes or individual object primitives. As such, querying the scene construction 124 has increased efficiency when compared to conventional techniques that involve individually checking intersections between rays and individual bounding volumes of the bounding volume hierarchy 126 and/or object primitives contained therein.

In one or more examples, the bounding volume hierarchy 126 is temporarily maintained in the storage 108 until the neural representations of the scene construction 124 are trained to encode the neural network information. In at least one example, the image generation module 116 allocates a first amount of memory within the storage 108 to store the bounding volume hierarchy 126 for generating ground truth data to train the neural representations of the scene construction 124. A second amount of memory is allocated by the image generation module 116 within the storage 108 to store the scene construction 124. The second amount of the memory is less than the first amount of the memory due to the scene construction 124 using neural representations in place of object primitives. After the neural representations of the scene construction 124 are trained, the bounding volume hierarchy 126 is optionally cleared from the storage 108, e.g., to free up computing resources for other processing tasks. For example, after training the neural representations of the scene construction 124 based on the ground truth data derived from the bounding volume hierarchy 126, the image generation module 116 deallocates the first amount of the memory in the storage 108 to increase an available capacity of the memory in the storage 108 for use by the computing device 102 in performing other tasks, e.g., for producing the rendered image 118.

In at least one example, generation of the scene construction 124 in this way supports reduced computational resource consumption by the computing device 102 (e.g., smaller allocations of the storage 108) during subsequent rendering operations than other scene construction techniques. The neural representations at the leaf nodes of the scene construction 124 consume less storage space in the storage 108 than if object primitives are stored, as is the case with conventional approaches to bounding volume hierarchies.

When used as an acceleration structure to feed a rendering process of the image generation module 116, the scene construction 124 formats the spatiality data defined by the scene geometry 122 in a way that facilitates frequent execution of visibility queries, in furtherance of rendering. The scene construction 124 is efficiently queried by the image generation module 116, for instance, to perform ray tracing or path tracing of the scene construction 124. The scene construction 124 enables the image generation module 116 to efficiently evaluate intersections between rays or ray segments 128 and corresponding encoded geometries, without directly evaluating object primitives. The neural representations of the scene construction 124 are queried directly during ray or path tracing to return object properties at intersections of the rays or ray segments 128 that are input to the neural representations. The image generation module 116 renders a scene based on object properties, visibility information, or other signals output from the scene construction 124. The outputs from the scene construction 124 are retrieved in response to the image generation module 116 inputting queries (e.g., the rays or ray segments 128) into the neural representations.

In at least one implementation, the image generation module 116 outputs the rendered image 118 based on ray or path tracing of the scene construction 124. For example, the computing device 102 causes the display device 112 to present the rendered image 118 of the scene in the user interface 110.

The techniques described herein overcome limitations of conventional bounding volume hierarchy techniques that are computationally expensive and/or fail to identify intersections to the rays or ray segments 128 in a timely manner, e.g., to support near real-time rendering. Further discussion of these and other advantages is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Architecture of Neural Bounding Volume Hierarchy

The following discussion describes neural bounding volume hierarchy techniques that are implementable utilizing the previously described systems and devices. Aspects of each of the procedures are implemented in hardware, firmware, software, or a combination thereof. The procedures are shown as a set of blocks that specify operations performed by one or more devices and are not limited to the orders shown for performing the operations by the respective blocks.

Figure 2:
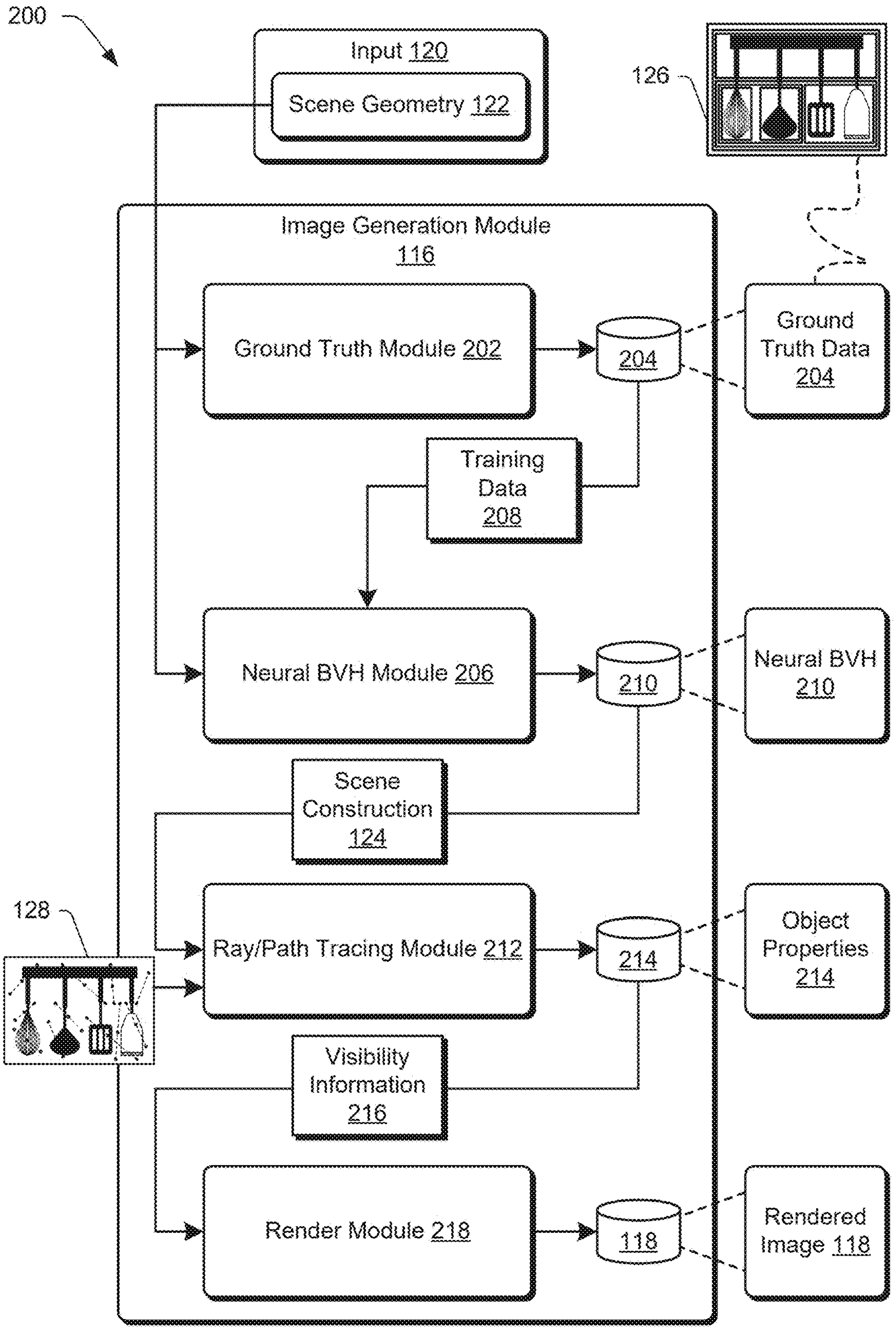
FIG. 2 depicts a system as an example implementation of an image generation module that is operable to employ techniques described herein for using neural based geometry in bounding volume hierarchies.

FIG. 2 depicts a system 200 as an example implementation of an image generation module that is operable to employ techniques described herein for using neural based geometry in bounding volume hierarchies. For example, the system 200 depicts the image generation module 116 in greater detail than in FIG. 1. Generally, the system 200 is operable to extract object properties of geometric objects from a 3D scene conveyed by the scene geometry 122. The object properties extracted by the system 200 are usable by the image generation module 116 for generating the rendered image 118 from different perspectives and under various lighting conditions.

As shown in FIG. 2, the image generation module 116 includes a ground truth module 202 that is operable to receive the scene geometry 122 and output ground truth data 204 in response. As one example, the ground truth module 202 generates the bounding volume hierarchy 126 to include the ground truth data 204 as information stored in leaf nodes of a hierarchal tree structure. The leaf nodes of the tree structure store the object primitives derived from the scene geometry 122. The ground truth data 204 (i.e., information derived from the object primitives) contained within the bounding volume hierarchy 126 provides a starting point for subsequently constructing a neural bounding volume hierarchy 210, which is a compact and efficient data structure for the scene construction 124. The ground truth data 204 is output from the ground truth module 202, for instance, to be used as training data 208 for training and re-training neural representations included in leaf nodes of the neural bounding volume hierarchy 210, as described below. In one or more implementations, the ground truth data 204 is analogous to the bounding volume hierarchy 126, including a plurality of the object primitives associated with each individual geometric object defined in the scene geometry 122.

The image generation module 116 also includes a neural bounding volume hierarchy (BVH) module, referred to throughout and labeled in FIG. 2 as a neural BVH module 206. The neural BVH module 206 is operable to produce the neural bounding volume hierarchy 210, which is usable as the scene construction 124 for enabling ray tracing and/or path tracing techniques in furtherance of rendering. In one or more examples, the neural BVH module 206 receives the scene geometry 122 and the training data 208 as inputs. Based on the scene geometry 122 and the training data 208, the neural BVH module 206 generates the neural bounding volume hierarchy 210 to encode spatiality data derived from the object primitives of the scene geometry 122. The spatiality data is encoded within one or more neural representations contained at leaf nodes of the neural bounding volume hierarchy 210. The neural representations of the neural bounding volume hierarchy 210 use the object primitives obtained from the training data 208 as ground truth data for learning the complex geometries of object surfaces defined by the scene geometry 122.

The image generation module 116 further includes a ray/path tracing module 212 that is operable to determine object properties 214 associated with the geometric objects defined by the scene geometry 122 by querying the scene construction 124. In one or more examples, the ray/path tracing module 212 refrains from accessing the scene geometry 122 and/or the object primitives defined therein. Instead, the ray/path tracing module 212 inputs the rays or ray segments 128 into the scene construction 124 to determine intersections between the rays or ray segments 128 and object surfaces encoded as neural network information by the neural representations.

A neural representation of the scene construction 124 is illustrated that receives one or more of the rays or ray segments 128 as inputs. These inputs or queries are different from a conventional query input to a scene construction during ray or path tracing. A conventional query includes individual points for checking intersections with the rays or ray segments 128. In contrast to conventional queries, the ray/path tracing module 212 inputs ray queries, e.g., ray segments, at least two coordinates, a single coordinate and direction. Inputting ray queries that have more than two coordinates (e.g., three or more) provides a way to balance a tradeoff between accuracy and efficiency.

The inputs are decoded by the neural representations of the scene construction 124 as one or more object properties 214. In at least one example, the object properties 214 include numerical (e.g., a Boolean, a scalar) outputs from the neural representations to indicate whether the rays or ray segments 128 being input, intersect with an object surface and/or an in-between condition (e.g., an intersection with a semi-transparent surface). These outputs are examples of the visibility information 216 and/or the object properties 214, which are usable to apply realistic shadows and/or light reflections to the rendered image 118. In addition to the visibility information 216, the object properties 214 that are output from the neural representations of the scene construction 124 include other information or signals about a ray or ray segment intersection to the geometry. The object properties 214 output from the neural representations, for instance, include a depth of the intersection, a normal at the intersection, material properties at the intersection, a color at the intersection, and/or other information defined by the scene geometry 122, and the neural network information encoded by the neural representations. In short, the neural representations of the scene construction 124 output the object properties 214 and the visibility information 216 as geometry data about object surfaces, including information about whether the ray or ray segment intersected (hit or missed) that surface. The visibility information 216 and/or the object properties 214 is output from the ray/path tracing module 212 for producing the rendered image 118.

A render module 218 of the image generation module 116 receives the visibility information 216 from the ray/path tracing module 212. Based on the visibility information 216, the render module 218 performs rendering techniques to produce the rendered image 118 to include realistic shadows and reflections on object surfaces of the geometric objects.

Each neural representation of the neural bounding volume hierarchy 210 represents a machine-learned model. As used herein, the term "machine-learning model" refers to a computer representation that is tunable (e.g., through training and retraining) based on inputs without being actively programmed by a user to approximate unknown functions, automatically and without user intervention. In particular, the term machine-learning model includes a model that utilizes algorithms to learn from, and make predictions on, known data by analyzing training data to learn and relearn how to generate outputs that reflect patterns and attributes of the training data. In addition to the neural representation examples provided below (e.g., neural hash grids, neural networks, sparse data structures), other examples of machine-learning models include convolutional neural networks (CNNs), long short-term memory (LSTM) neural networks, generative adversarial networks (GANs), decision trees, support vector machines, linear regressions, logistic regressions, Bayesian networks, random forest learning models, dimensionality reduction algorithms, boosting algorithms, deep learning neural networks, etc.

In the illustrated example, the neural representations of the neural bounding volume hierarchy 210 are configured using a plurality of layers including, respectively, a plurality of nodes. The plurality of layers are configurable to include an input layer, an output layer, and one or more hidden layers. Calculations are performed by the nodes within the layers via hidden states through a system of weighted connections that are "learned" during training and retraining of the neural representation to implement a variety of tasks.

To train the neural representations of the neural bounding volume hierarchy 210, the training data 208 (e.g., the bounding volume hierarchy 126) is received to provide examples of "what is to be learned" by that respective neural representation, i.e., as a basis to learn patterns from the training data 208. The neural representations, for instance, collect and preprocess the bounding volume hierarchy 126 as the training data 208 to include input features and corresponding target labels, i.e., of what is exhibited by the input features. The neural BVH module 206 then initializes parameters of the neural representations of the neural bounding volume hierarchy 210, which are used as internal variables to represent and process information during training and represent inferences gained through training. In an implementation, the training data 208 for the neural representations described herein is separated into batches to improve processing and optimization efficiency of the parameters during training.

A portion of the training data 208 is then received as an input by each neural representation of the neural bounding volume hierarchy 210. Each portion of the training data 208 is used as a basis for generating predictions based on a current state of parameters of layers and corresponding nodes, a result of which is output as output data. Output data describes an outcome of the task, e.g., as a probability of being a member of a particular class in a classification scenario.

In one or more examples, the neural representations of the neural bounding volume hierarchy 210 are trained to learn the visibility information 216 associated with each leaf node of the bounding volume hierarchy 126. For instance, a neural representation is trained by sampling rays or ray segments cast into the object primitive(s) stored in corresponding leaf nodes of the bounding volume hierarchy 126. Without any prior knowledge of the underlying geometry represented by the scene geometry 122, a goal for training the neural representations is to learn the object primitive based geometries through uniform sampling of each voxel represented by the scene geometry 122.

A density of the rays or ray segments cast into the bounding volume hierarchy is measurable between a start point po and an endpoint pi of a ray or ray segment. This density becomes uniform when voxel boundaries are sampled according to corresponding projected areas, as seen from uniformly sampled directions ωo on a unit sphere about that voxel. For example, to sample a projected area for each voxel face, given a ray or ray segment with a random direction ωo, a dot product of each face normal n with the directions ωo is computed. Voxel faces with negative results are discarded and remaining voxel faces are sampled proportionally to a dot product of the voxel faces. Next, a point po on each voxel face is uniformly sampled at random. An opposite point of incidence pi to the point po is given by an intersection between a voxel boundary and a ray or ray segment originating at the point po and traced in direction −ωo. The neural representation's input points are then uniformly distributed along the sampled segment from the point po to the point pi.

Training of the neural bounding volume hierarchy 210 described herein includes calculating a loss function to quantify a loss associated with operations performed by nodes of the neural representations. The calculating of the loss function, for instance, includes implementing functions for comparing a difference between predictions specified in the output data from the neural bounding volume hierarchy 210 with target labels specified by the training data 208. The loss function is configurable in a variety of ways, examples of which include regret, Quadratic loss function as part of a least squares technique, and so forth.

Calculation of the loss function also includes use a backpropagation operation as part of minimizing the loss function and thereby training parameters of the neural representations. Minimizing the loss function, for instance, includes adjusting weights of the nodes to minimize the loss and thereby optimize performance of the neural representations in performance of a particular task. The adjustment is determined by computing a gradient of the loss function, which indicates a direction to be used to adjust the parameters to minimize the loss. The parameters of the neural representations of the neural bounding volume hierarchy 210 are then updated based on the computed gradient.

In an example, this process continues over a plurality of iterations until the neural BVH module 206 determines that a stopping criterion is met. The stopping criterion employed by the neural representations in this example is selected to promote overfitting or otherwise optimizing of one or more of the neural representations, reduce computational resource consumption, and/or promote an ability of the neural representations to address previously unseen data, i.e., information that is not actually included as an example in the training data 208. Examples of a stopping criterion include but are not limited to a predefined number of epochs, validation loss stabilization, achievement of a performance improvement threshold, or based on performance metrics such as precision and recall. While overfitting of the neural representations is often undesirable, the neural representations of the neural bounding volume hierarchy 210 are overfit trained to encode geometries for the specific 3D scene represented by the scene geometry 122. The neural BVH module 206, for instance, overfit trains the neural representations based on the scene geometry 122, as stored in the bounding volume hierarchy 126, to recognize the object properties 214 and the visibility information 216 of surfaces and objects in the 3D scene represented by the scene geometry 122. In one or more other examples, the neural representations of the neural bounding volume hierarchy 210 are optimized in other ways (e.g., without overfitting) to encode the geometries for the specific 3D scene represented by the scene geometry 122.

Figure 3:
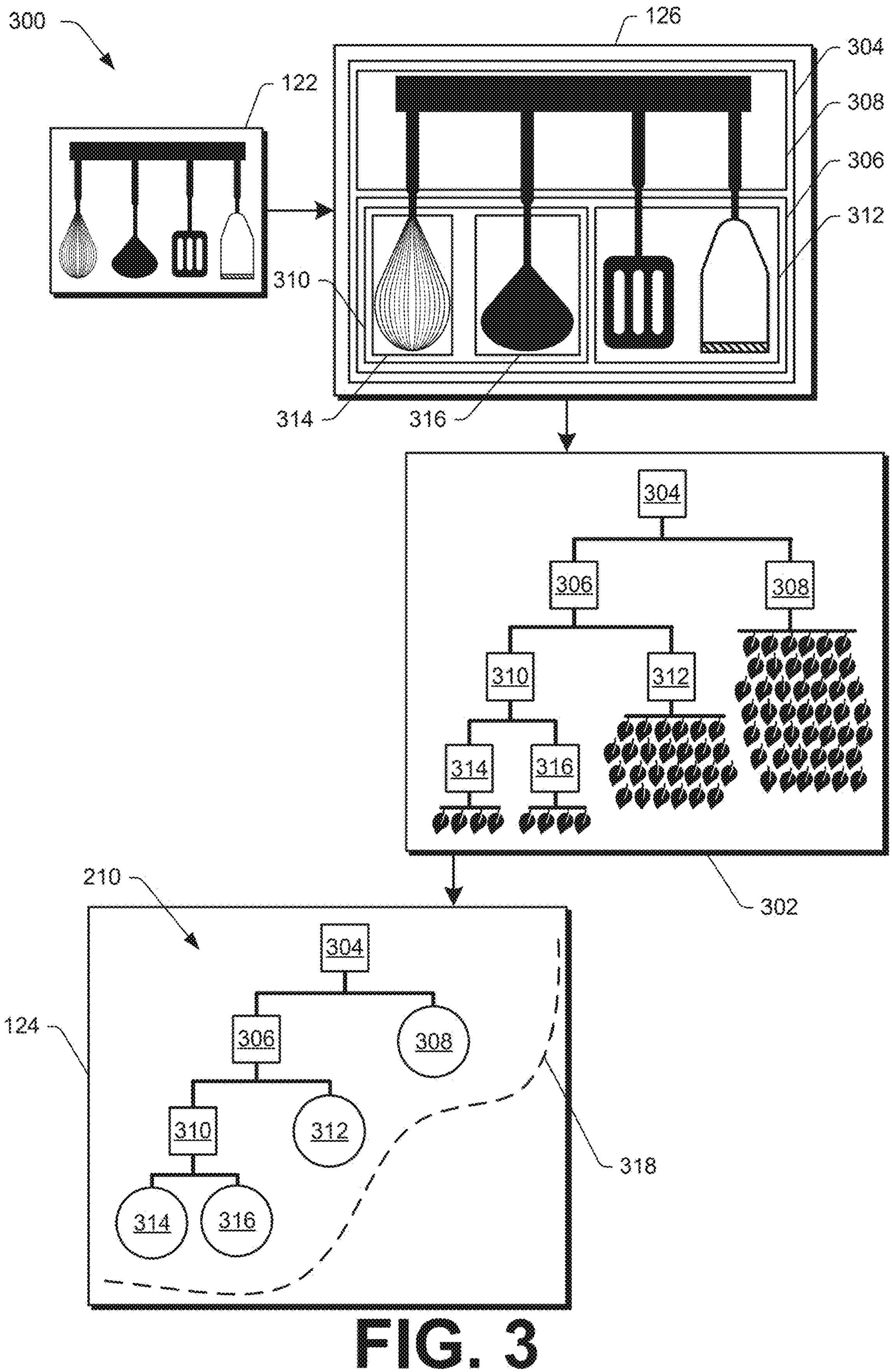
FIG. 3 depicts a system as an example implementation of a neural bounding volume hierarchy module that is operable to employ techniques described herein for generating neural based geometry in bounding volume hierarchies.

FIG. 3 depicts a system as an example implementation of a neural bounding volume hierarchy module that is operable to employ techniques described herein for generating neural based geometry in bounding volume hierarchies. As illustrated, the system 300 depicts aspects of the neural BVH module 206 in greater detail than in FIG. 2. Generally, the system 300 is operable to generate the neural bounding volume hierarchy 210 to be used as the scene construction 124 for rendering a 3D scene conveyed by the scene geometry 122. The neural bounding volume hierarchy 210 is a compressed data structure usable as the scene construction 124 to map 3D points in the scene geometry 122 to values representing intersections or misses with object surfaces in the scene geometry 122.

As illustrated in FIG. 3, the bounding volume hierarchy 126 is based on a tree structure 302 that is terminated at one or more lowest branch nodes by multiple leaf nodes. Each leaf node stores one or more object primitives (e.g., triangles, polygons) encompassed by a corresponding bounding volume of the bounding volume hierarchy 126. As illustrated in FIG. 3, the tree structure 302 includes a root node that maps to a bounding volume 304, which is the largest bounding volume of the bounding volume hierarchy 126. Beyond the root node, the tree structure 302 includes several lower branch nodes, which map to smaller bounding volumes of the bounding volume hierarchy 126. A first branch node, for instance, maps to a bounding volume 306 and a second branch node maps to a bounding volume 308. A third branch node maps to a bounding volume 310, a fourth branch node maps to a bounding volume 312, a fifth branch node maps to a bounding volume 314, and a sixth branch node maps to a bounding volume 316. In one or more variations, the tree structure 302 includes additional branch nodes mapping to other bounding volumes, which for simplicity of the drawings are not shown in FIG. 3.

As depicted in FIG. 3, multiple leaf nodes follow each of the lowest branch nodes of the tree structure 302. The second branch node, for instance, includes a group of leaf nodes encompassing the object primitives that map to the bounding volume 308. The fourth branch node includes another group of leaf nodes encompassing the object primitives that map to the bounding volume 312. The fifth and sixth branch nodes include different groups of leaf nodes encompassing the object primitives that map to the bounding volume 314 and the bounding volume 316, respectively. Storing the object primitives extracted from the scene geometry 122 across multiple groups of leaf nodes this way causes the bounding volume hierarchy 126 to occupy large amounts of memory or storage, which is unfeasible for some computing environments.

To improve efficiency and reduce a storage footprint of the bounding volume hierarchy 126, the neural BVH module 206 prunes the tree structure 302 and generates the neural bounding volume hierarchy 210 to include fewer nodes. The neural bounding volume hierarchy 210 is generated to replace the groups of leaf nodes that terminate the bounding volume hierarchy 126 with neural representations that are illustrated as circles in FIG. 3. For example, a tree cut 318 is applied to the tree structure 302. The neural BVH module 206 defines the tree cut 318 to achieve a high reconstruction quality for a desired rendering performance. Applying the tree cut 318 to the tree structure 302 effectively replaces the groups of leaf nodes of the bounding volume hierarchy 126 with an equivalent neural representation, as depicted by the neural bounding volume hierarchy 210. The tree cut 318 causes each of the second, fourth, fifth, and sixth branch nodes (and the underlying groups of corresponding leaf nodes) of the bounding volume hierarchy 126 to be replaced by corresponding neural representations. In the illustrated example, a first leaf node of the neural bounding volume hierarchy 210 includes a first neural representation to encode the object primitives encompassed by the bounding volume 308. A second leaf node of the neural bounding volume hierarchy 210 includes a second neural representation to encode the object primitives encompassed by the bounding volume 312. A third leaf node of the neural bounding volume hierarchy 210 includes a third neural representation to encode the object primitives encompassed by the bounding volume 314. A fourth leaf node of the neural bounding volume hierarchy 210 includes a fourth neural representation to encode the object primitives encompassed by the bounding volume 316.

Replacing groups of leaf nodes that include object primitives with neural representations allows the neural bounding volume hierarchy 210 to be constructed with far fewer nodes than the bounding volume hierarchy 126. For example, the neural bounding volume hierarchy 210 includes fewer nodes than the bounding volume hierarchy 126. Using fewer nodes, as well as encoding the object primitives extracted from the scene geometry 122 as neural network information contained in neural representations, enables the neural bounding volume hierarchy 210 to occupy less memory or storage than the bounding volume hierarchy 126. Reducing a memory footprint of the scene construction 124 improves efficiency of rendering operations performed by the image generation module 116.

The neural representations are machine-learned models trained to retrieve a signal (e.g., the visibility information 216, the object properties 214) learned from the training data 208 used to train the neural representations at training time. In one or more examples, the neural representations include one or more neural network models. In other examples, the neural representations include one or more neural hash grids. In at least one variation, the neural representations include one or more sparse data structures of various types. As a non-limiting example, and for ease of description, the neural representations are described throughout the disclosure as being neural hash grids.

A neural hash grid is a sparse data structure designed to efficiently encode implicit neural representations, which are commonly used for encoding multimedia signals like images and radiance fields, while still preserving a high degree of quality. These implicit neural representations are frameworks that implicitly represent complex functions using neural networks. Implicit neural representations are particularly useful for tasks like image synthesis, 3D scene reconstruction, and other computer vision applications. As such, a neural hash grid is not the same as a typical hash grid data structure, but rather a neural network based sparse data structure designed to be stored in a compressed way.

The neural representations implemented by the neural hash grids encode signals (e.g., the visibility information 216, the object properties 214) as various forms of information, including a binary, a scalar, and so forth. In one or more examples, the neural representations output responses as a Boolean value to indicate the presence of an attribute or absence of the attribute, for instance, visible or not visible. In at least one example, the neural representations output responses that indicate variability in an attribute as defined by a value selected from a range of values. A scalar response is used define a specific value within the range of values as a way to indicate an in-between condition (e.g., a semitransparent surface returns visibility information defined by a value indicative of an amount of transparency, which ranges from a first value assigned to fully-transparent surfaces and a second value assigned to fully-opaque surfaces). The neural representations perform a segment encoding step that transforms an input query (e.g., the rays or ray segments 128) into higher dimensional latent descriptors. This segment encoding is followed by a visibility decoding step, which causes the neural representations to map these latent descriptors to the responses (e.g., the visibility information 216, the object properties 214) that are output from the neural bounding volume hierarchy 210.

In one or more examples, each time the neural hash grid is queried, a query position associated with a cell of the neural hash grid is determined. Each cell has multiple corners (e.g., four, eight) each encoding a feature optimized at training time. The encoded feature corresponds to the query position within an implicit neural representation associated with that cell.

Each neural hash grid includes multiple levels of cells. The corner features associated with a cell from a first level are concatenable about a corresponding query position. The concatenated corner features of the first level are concatenable with corner features that have been concatenated about other corresponding cells located at each of the other levels. This concatenation among the corner features and subsequently among the multiple levels of cells produces a large vector that corresponds to a 3D query point derived from the input query.

The architecture of the neural hash grids influences an overall memory footprint and inference speed associated with the neural bounding volume hierarchy 210. As one non-limiting example, encoding the same neural hash grid to encompass multiple levels of leaf nodes from the bounding volume hierarchy 126 improves the reconstruction quality of the scene geometry 122, as well as reduces the quantity levels encoded in the neural hash grid. The neural hash grids used for the neural representations of the neural bounding volume hierarchy 210, for instance, are parameterized by eight levels, including two corner features per each cell of each level.

In one or more implementations, this large vector is passed through a multilayer perceptron (MLP) to obtain a signal originally attached (e.g., at training time) to the 3D query point. During rendering, the signal is recoverable by querying the neural representations at the various 3D query points. An input to the neural hash grid includes a 3D query point, and an output from the neural hash grid is a signal with information, e.g., the visibility information 216, the object properties 214.

For a given neural representations of the neural bounding volume hierarchy 210, a queried ray or ray segment intersects with each leaf node of a corresponding bounding volume. Then, n points are uniformly distributed along the intersected sub-segment, such that each of the n points is spatially encoded into the neural representation, e.g., the neural hash grid. Stacking the n latent codes obtained from this encoding produces a single vector. The correlated encoding of the n points along a ray or ray segment together with the compact format of the neural representation (e.g., the neural hash grid) enables highly varying functions to be represented by neural network information encoded therein, while further providing an alias-free consistency across neighbor rays or ray segments. For example, the neural representation encodes one or more three-dimensional points that are sampled along each of the ray segments into respective latent vectors that are concatenable to define the object properties. In some examples, the number of samples n equals one, e.g., a single three-dimensional point at the center of the ray or ray segment. Larger values of n increase precision of the visibility information 216 and/or the object properties 214, at a cost of using additional queries into the neural representations, e.g., additional neural hash grid queries. In some implementations, setting n to be three points provides an acceptable trade-off between accurately representing the visibility information 216 while also achieving high performance.

In one or more implementations, the concatenated vector obtained from the stacking of the n latent codes obtained from encoding the neural representations is passed through an MLP or other logical unit to obtain a signal attached (e.g., at training time) to the 3D query point along the ray or ray segment input. A shallow MLP with one hundred twenty eight neurons, four hidden layers and a sigmoid output activation, for instance, map the output of the neural bounding volume hierarchy 210 (e.g., the visibility information) to a value that ranges between zero and one. In some examples, this value is reduced to a binary or scalar value for use as the visibility information 216, e.g., to indicate whether the ray or ray segment hit or missed an object surface.

Figure 4:
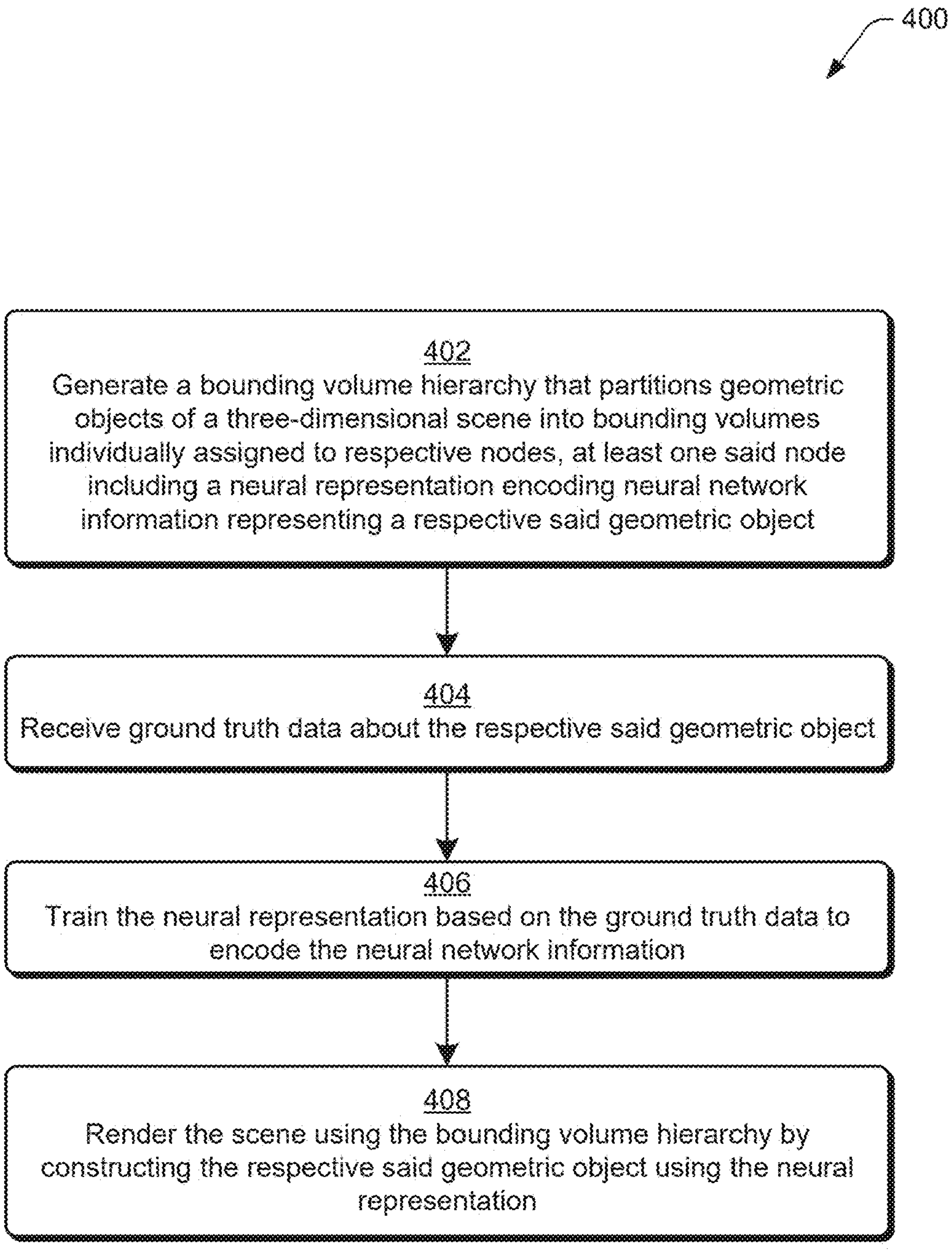
FIG. 4 is a flow diagram depicting an algorithm as a step-by-step procedure, which is performable by a processing device to train or re-train neural based geometry in bounding volume hierarchies.

FIG. 4 is a flow diagram depicting an algorithm as a step-by-step procedure 400, which is performable by a processing device to train or re-train neural based geometry in bounding volume hierarchies. The procedure 400 is executed by the neural BVH module 206 to train the neural representations contained in the neural bounding volume hierarchy 210 to encode neural network information representing the object primitives of the bounding volume hierarchy 126.

When the procedure 400 is executed at training time, there is no image being rendered. Two sets of rays (e.g., two identical sets of rays, two similar but not identical sets of rays) are cast into the bounding volume hierarchy 126 and the neural bounding volume hierarchy 210. For example, the ray/path tracing module 212 generates the sets of rays in a seemingly random way to cover many ray directions that are sufficient to completely train the neural representations of the neural bounding volume hierarchy 210. In this way, training the neural representations of the neural bounding volume hierarchy 210 is not dependent on a specific viewpoint for producing the rendered image 118. In other words, the neural representations of the neural bounding volume hierarchy 210 are trained to determine any possible viewpoint of the scene geometry 122, without any prior information about a desired point of view for the rendered image 118.

The output of the neural bounding volume hierarchy 210 is compared to the output of the bounding volume hierarchy 126 (e.g., the training data 208) to determine whether the two outputs match. If there is not a match between the two outputs (e.g., the visibility information 216 output from the neural bounding volume hierarchy 210 does not match visibility information output as the training data 208 derived from the bounding volume hierarchy 126) the output from the bounding volume hierarchy 126 is backpropagated through the neural bounding volume hierarchy 210 for continued training.

At the start of the procedure 400, a bounding volume hierarchy is generated that partitions geometric objects of a three-dimensional scene into bounding volumes individually assigned to respective nodes, at least one said node including a neural representation encoding neural network information representing a respective said geometric object (block 402). For example, the neural BVH module 206 generates the scene construction 124 based on the scene geometry 122 to include the neural bounding volume hierarchy 210.

Ground truth data about the respective said geometric object is received (block 404). The bounding volume hierarchy 126 is generated, for instance, to partition the geometric objects of the scene geometry 122 into bounding volumes individually assigned to respective nodes in the bounding volume hierarchy 126. At least one said node of the bounding volume hierarchy 126 includes object primitives that are usable to derive the ground truth data 204 for training the respective said geometric object of the neural bounding volume hierarchy 210. In one or more implementations, the ground truth data 204 used to train the neural representations of the neural bounding volume hierarchy 210 is obtained by ray tracing the bounding volume hierarchy 126 at each of the leaf nodes to derive the ground truth data 204 from the object primitives contained in the leaf nodes.

The neural representation is trained based on the ground truth data to encode the neural network information (block 406). Referring back to FIG. 3, the neural bounding volume hierarchy 210 and the bounding volume hierarchy 126, for instance, are both ray traced, or path traced, to identify intersections at object surfaces in the scene geometry 122. Respective outputs are obtained from separately ray tracing the neural bounding volume hierarchy 210 and the bounding volume hierarchy 126, and a comparison between the respective outputs is determined. If the outputs match, the neural bounding volume hierarchy is considered to be trained. If the outputs do not match, the ray tracing outputs of the bounding volume hierarchy 126 are back propagated through the neural representations of the neural bounding volume hierarchy 210 until a comparison between the outputs indicates a match, e.g., the outputs correlate to within an acceptable threshold difference that approaches zero.

The scene is rendered using the bounding volume hierarchy by constructing the respective said geometric object using the neural representation (block 408). As one example, once trained, the scene construction 124 is input to the ray/path tracing module 212 to obtain the visibility information 216 and/or the object properties 214. The render module 218 performs rendering techniques that apply the visibility information 216 and/or the object properties 214 in producing the rendered image 118.

Figure 5:
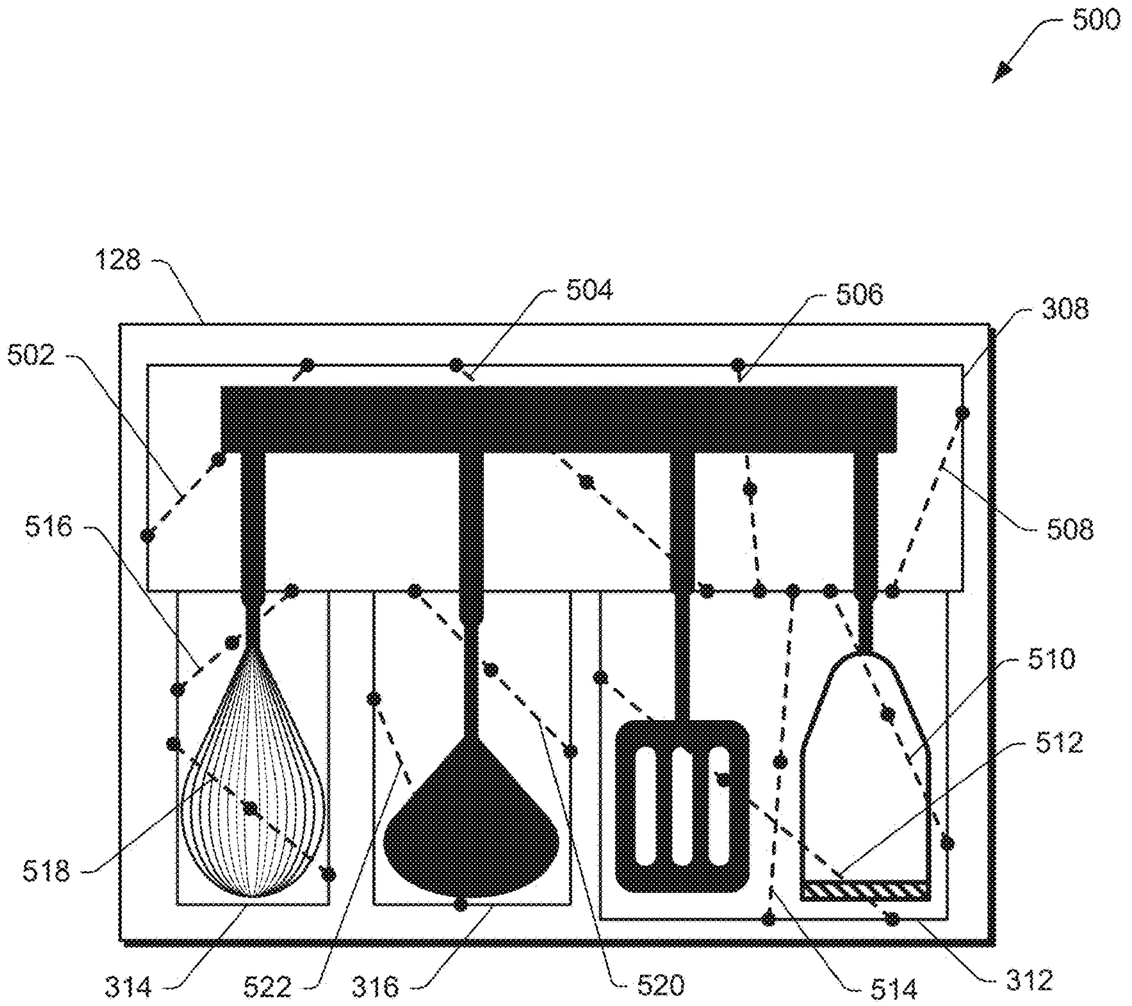
FIG. 5 depicts a system as an example implementation of a ray tracing module that is operable to employ techniques described herein for using neural based geometry in bounding volume hierarchies as a scene construction.

FIG. 5 depicts a system as an example implementation of a ray tracing module that is operable to employ techniques described herein for using neural based geometry in bounding volume hierarchies as a scene construction. The system 500 depicts aspects of the ray/path tracing module 212 in greater detail than in FIG. 2. Generally, the system 500 is operable to query the scene construction 124 (e.g., the neural bounding volume hierarchy 210) and obtain visibility information 216 and/or object properties 214 associated with object surfaces represented in the 3D space of the scene geometry 122.

In one or more examples, the ray/path tracing module 212 receives the scene construction 124 and queries information from the neural representations of the neural bounding volume hierarchy 210. The ray/path tracing module 212, for instance, inputs the rays or ray segments 128 into the neural representations of the neural bounding volume hierarchy 210 to determine the object properties 214 and/or the visibility information 216 at intersections between the rays or ray segments 128 and respective geometric objects represented by the neural representations.

In one or more implementations, multiple points (e.g., three points) are used to define each ray or ray segment cast into the scene construction 124 as input queries to the neural representations, e.g., the neural hash grids. Each of the multiple points is an XYZ coordinate, for instance, which is passed into the neural hash grids independently. The outputs of the neural hash grids are then concatenated to obtain a concatenated result for each of the multiple points of that ray or ray segment. Recall, as previously mentioned, in one or more implementations, this concatenated vector is passed through a MLP to derive each neural representation response (e.g., the visibility information 216, the object properties 214).

The ray/path tracing module 212 casts one or more ray segments into each of the neural representations. For example, ray segments 502, 504, 506, and 508 are cast into the neural representation associated with the bounding volume 308. Ray segments 510, 512, and 514 are cast into the neural representation associated with the bounding volume 312. Ray segments 516 and 518 are cast into the neural representation associated with the bounding volume 314. Ray segments 520 and 522 are cast into the neural representation associated with the bounding volume 316. The multiple points of the ray segments being cast by the ray/path tracing module 212 are, for example, transformed into vectors usable as query inputs into each of the neural representations being tested.

In response to querying each of the neural representations as depicted in the example of FIG. 5, the ray/path tracing module 212 determines whether there is intersection between part of the ray segments being cast and part of the geometry encoded by the neural representation associated with the bounding volume being tested.

In one or more implementations, a same ray segment is used by the ray/path tracing module 212 to test multiple neural representations. The neural representations are operable to generate different responses (e.g., different visibility information) associated with the same ray segment, including by identifying different portions of the same ray segment that intersect with the geometry encoded by the different neural representations. Casting rays or ray segments into the scene construction 124 simplifies the operations of the ray/path tracing module 212 and improves efficiency of the ray or path tracing techniques that are performed in furtherance of rendering.

Figure 6:
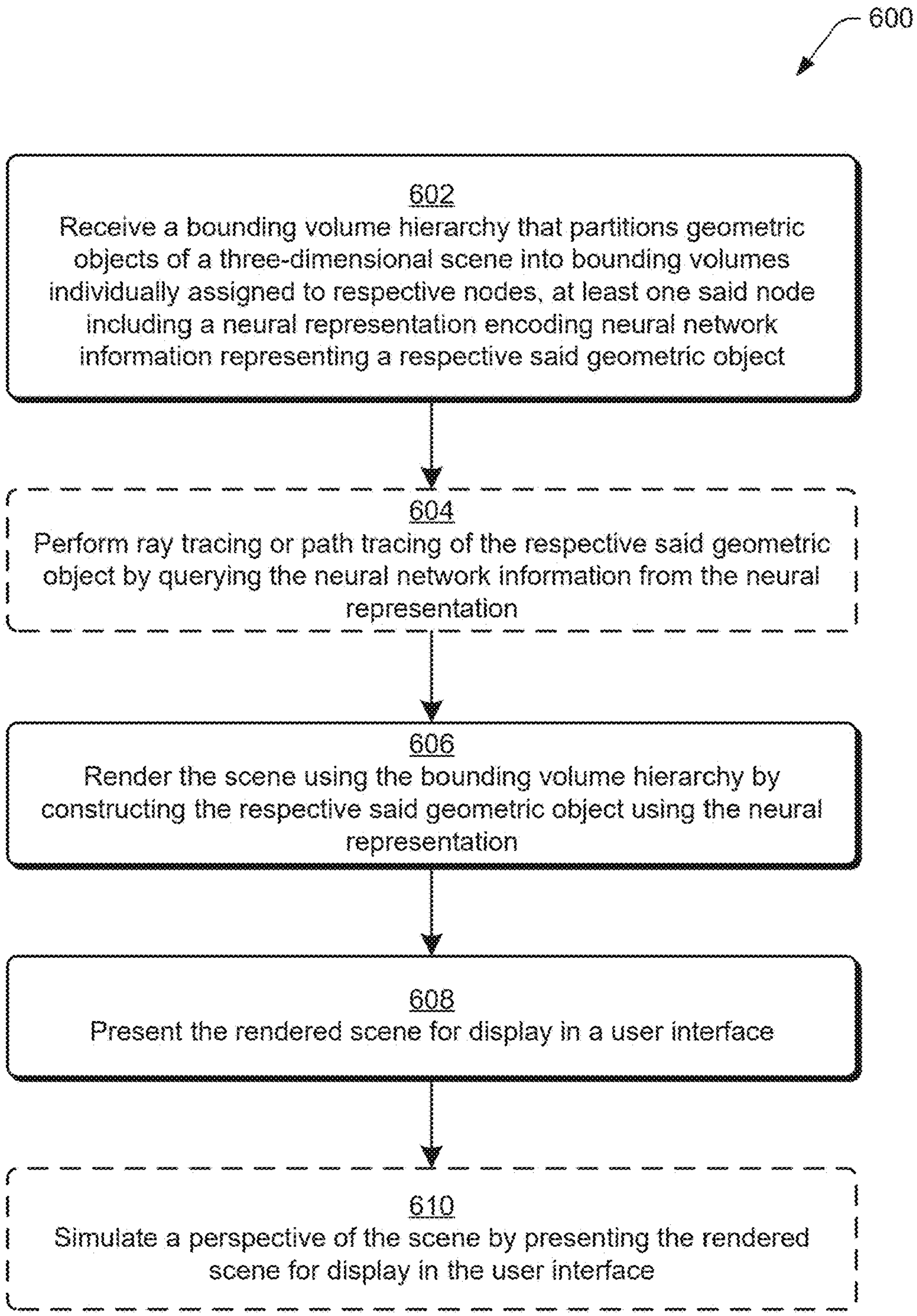
FIG. 6 is a flow diagram depicting an algorithm as a step-by-step procedure, which is performable by a processing device to use neural based geometry in bounding volume hierarchies.

FIG. 6 is a flow diagram depicting an algorithm as a step-by-step procedure 600, which is performable by a processing device to use neural based geometry in bounding volume hierarchies. The procedure 600 is executed by the image generation module 116 to render an image from the scene geometry 122 by querying the scene construction 124.

At the start of the procedure 600, a bounding volume hierarchy is received that partitions geometric objects of a three-dimensional scene into bounding volumes individually assigned to respective nodes, at least one said node including a neural representation encoding neural network information representing a respective said geometric object (block 602). For example, the neural BVH module 206 performs operations described herein to generate the neural bounding volume hierarchy 210, which uses neural representations to encode complex geometries inferred from the scene geometry 122.

Optionally, the procedure 600 includes performing ray tracing or path tracing of the respective said geometric object by querying the neural network information from the neural representation (block 604). To extract the visibility information 216 and/or the object properties 214 of the scene geometry 122, the ray/path tracing module 212 performs ray or path tracing techniques on the scene construction 124, for instance, by testing ray segments. The ray segments are input queries to the neural representations for determining intersections between object surfaces defined by the scene geometry 122.

Next, the scene is rendered using the bounding volume hierarchy by constructing the respective said geometric object using the neural representation (block 606). The visibility information 216 derived from the scene construction 124 is usable by the render module 218, for instance, to determine lighting effects and/or shadows to be applied to object surfaces of the scene geometry 122. The render module 218 produces a realistic image of the scene geometry and outputs the image as the rendered image 118.

The rendered scene is presented for display in a user interface (block 608). As one example, the image generation module 116 outputs the rendered image 118, which is included for display in the user interface 110.

Optionally, a perspective of the scene is simulated by presenting the rendered scene for display in the user interface (block 610). For example, in outputting the rendered image 118, the image generation module 116 supports a near real-time update of a simulated environment presented in the user interface 110. Due to the efficiency gains provided by the neural bounding volume hierarchy 210 and the neural representations, execution of the procedure 600 facilitates frequent updates to the user interface 110 (e.g., in response to user inputs received therein) with additional versions of the rendered image 118.

Example System and Device

Figure 7:
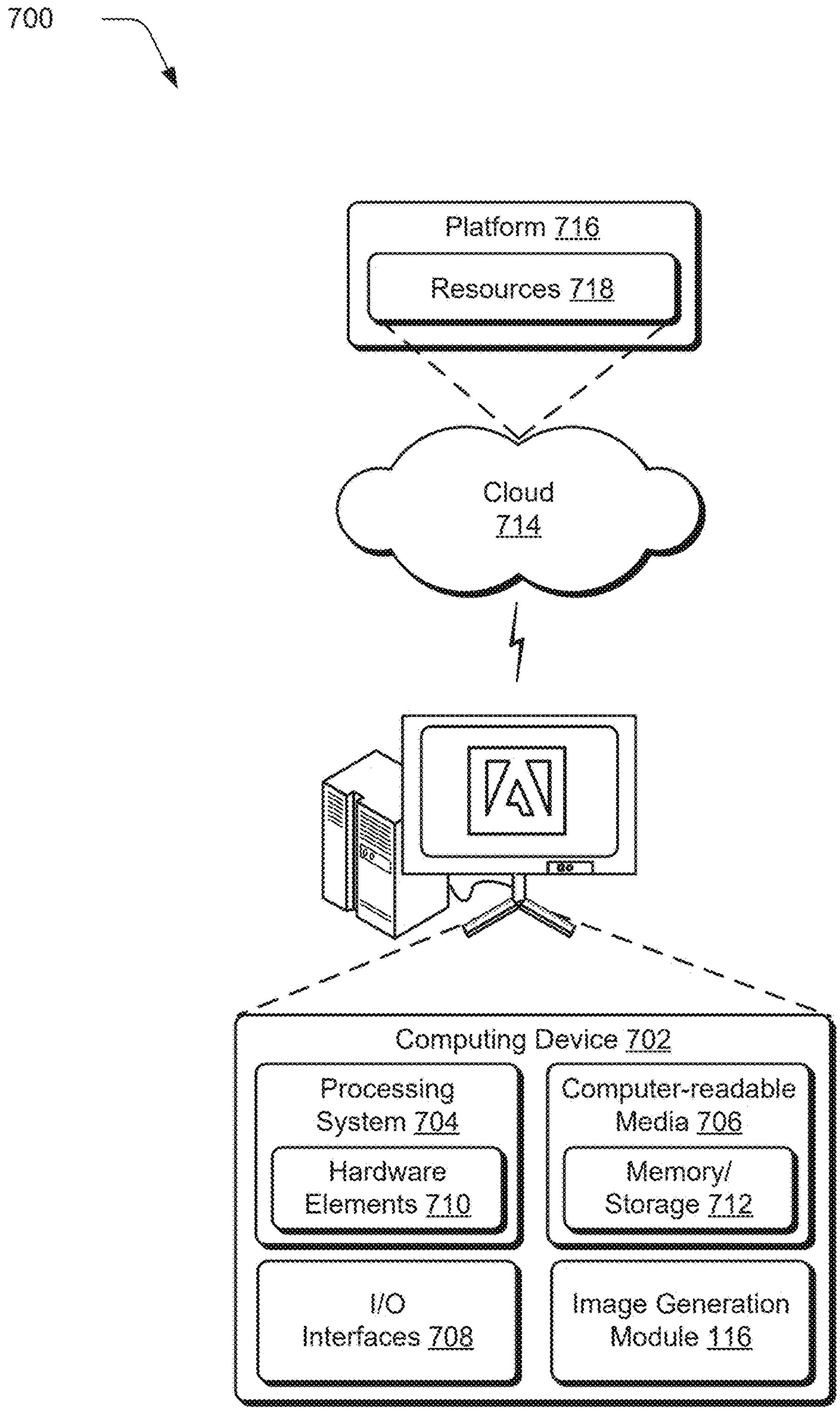
FIG. 7 illustrates an example system including various components of an example device usable as any type of computing device as described and/or utilized with reference to FIGS. 1-6 to implement examples of the techniques described herein.

FIG. 7 illustrates an example system 700 including various components of an example device usable as any type of computing device as described and/or utilized with reference to FIGS. 1-6 to implement examples of the techniques described herein. FIG. 7 illustrates an example system 700 generally, which includes an example computing device 702 that is representative of one or more computing systems and/or devices that implement the various techniques described herein. This is illustrated through inclusion of the image generation module 116. The computing device 702 is configurable, for instance, as a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 further includes a system bus or other data and command transfer system that couples the various components, one to another. In one or more examples, a system bus includes any one, or combination, of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including the hardware elements 710, which are configurable as processors, functional blocks, and so forth. This includes implementation in hardware as an application specific integrated circuit or other logic device formed using one or more semiconductors. The hardware elements 710 are not limited by the materials that form the hardware elements 710, or the processing mechanisms employed therein. For example, processors are configurable as semiconductor(s) and/or transistors, e.g., electronic integrated circuits (ICs). In such a context, processor-executable instructions are electronically executable instructions.

The computer-readable media 706 is storage media illustrated as including memory/storage 712. The memory/storage 712 represents memory/storage capacity associated with one or more computer-readable media. The memory/storage 712 is configured as a memory component, for example, which is configured to store the neural bounding volume hierarchy 210 that partitions geometric objects of a three-dimensional scene into bounding volumes individually assigned to respective nodes. At least one said node of the neural bounding volume hierarchy 210 includes a neural representation encoding neural network information representing a respective said geometric object. The memory/storage 712 includes volatile media (such as random access memory (RAM)) and/or nonvolatile media, such as read-only memory (ROM), Flash memory, optical disks, magnetic disks, and so forth. The memory/storage 712 includes fixed media (e.g., RAM, ROM, a fixed hard drive, and so on) as well as removable media, e.g., Flash memory, a removable hard drive, an optical disc, and so forth. The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways to support user interaction, as described herein.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms and for a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of signal characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some examples to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously. For example, the hardware elements 710 include a processing device coupled to the memory component implemented by the memory/storage 712 to perform operations of the image generation module 116. The operations, when executed, cause the processing device implemented by the hardware elements 710 to render a scene using the neural bounding volume hierarchy 210 stored in the memory/storage 712, including for constructing the respective said geometric object using the neural representations.

Combinations of the foregoing are also employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (e.g., at least one computing device 702 and/or processing systems 704) to implement techniques, modules, and examples described herein.

The techniques described herein are supported by various configurations of the computing device 702 and are not limited to the specific examples of the techniques described herein. This functionality is also implementable or partially implementable through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data utilized while computer processing is executed on servers that are remote from the computing device 702. In at least one example, the resources 718 include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device example, implementation of functionality described herein is distributable throughout the system 700. The functionality is implementable in part on the computing device 702 as well as via the platform 716 that abstracts the functionality of the cloud 714.

Although the techniques have been described in language specific to structural features and/or methodological acts, it is to be understood that the techniques defined in the appended claims are not limited to the specific features or acts described. Rather, the specific features and acts are disclosed as example forms of implementing the claims.

What is claimed is:

1. A method comprising:

receiving, by a processing device, a bounding volume hierarchy that partitions geometric objects of a three-dimensional scene into bounding volumes individually assigned to respective nodes, at least one said node including a neural representation encoding neural network information representing a respective said geometric object;

rendering, by the processing device, the scene using the bounding volume hierarchy by constructing the respective said geometric object using the neural representation; and presenting, by the processing device, the rendered scene for display in a user interface.

2. The method of claim 1, wherein constructing the respective said geometric object using the neural representation includes performing ray tracing or path tracing of the respective said geometric object by querying the neural network information from the neural representation.

3. The method of claim 2, wherein querying the neural network information from the neural representation includes determining object properties at intersections between ray segments and the respective said geometric object by inputting the ray segments into the neural representation.

4. The method of claim 3, wherein the neural representation encodes one or more three-dimensional points that are sampled along each of the ray segments into respective latent vectors that are concatenable to define the object properties.

5. The method of claim 1, wherein the neural representation includes one or more neural network models that are trained to overfit the neural network information.

6. The method of claim 1, wherein the neural representation includes one or more neural hash grids that are trained to overfit the neural network information.

7. The method of claim 1, wherein the neural representation includes one or more sparse data structures that compress the neural network information.

8. The method of claim 1, further comprising simulating, by the processing device, a perspective of the scene by presenting the rendered scene for display in the user interface.

9. A system comprising:

a memory component configured to store a bounding volume hierarchy that partitions geometric objects of a three-dimensional scene into bounding volumes individually assigned to respective nodes, at least one said node including a neural representation encoding neural network information representing a respective said geometric object; and a processing device coupled to the memory component to perform operations that render the scene using the bounding volume hierarchy by constructing the respective said geometric object using the neural representation.

10. The system of claim 9, wherein the neural network information includes visibility information about the respective said geometric object.

* * * * *